United States Patent
Read

(10) Patent No.: US 9,010,575 B2
(45) Date of Patent: Apr. 21, 2015

(54) PIPING BAG AND NOZZLE

(71) Applicant: Cappel Norrow Limited, Central Milton Keynes (GB)

(72) Inventor: Hugh Read, Milton Keynes (GB)

(73) Assignee: Cappel Norrow Limited, Central Milton Keynes (GB)

(*) Notice: Subject to any disclaimer, the term of this patent is extended or adjusted under 35 U.S.C. 154(b) by 0 days.

(21) Appl. No.: 13/801,098

(22) Filed: Mar. 13, 2013

(65) Prior Publication Data

US 2013/0306674 A1 Nov. 21, 2013

Related U.S. Application Data

(60) Provisional application No. 61/663,001, filed on Jun. 22, 2012.

(30) Foreign Application Priority Data

May 18, 2012 (GB) .................................. 1208779.7
Feb. 26, 2013 (GB) .................................. 1303419.4

(51) Int. Cl.
- *B65D 35/22* (2006.01)
- *B65D 35/38* (2006.01)
- *A23G 3/28* (2006.01)
- *A21C 15/00* (2006.01)

(52) U.S. Cl.
CPC ........ *B65D 35/38* (2013.01); *A23G 3/28* (2013.01); *A21C 15/005* (2013.01)

(58) Field of Classification Search
CPC ........ A23G 3/28; B65D 35/22; B65D 83/682; B65D 35/242; B65D 35/38; A21C 15/005

USPC ........ 222/145.3, 547, 566–567, 570, 460–46, 222/460–462, 132–136, 212–215, 630–632, 222/90–107, 153.01

See application file for complete search history.

(56) References Cited

U.S. PATENT DOCUMENTS

| 4,961,517 A * | 10/1990 | Tkac ................................ 222/94 |
| 5,102,016 A * | 4/1992 | Ball et al. .................... 222/145.3 |
| 5,114,044 A * | 5/1992 | Spanek, Jr. ...................... 222/94 |
| 2007/0000943 A1* | 1/2007 | Morgan ......................... 222/107 |

FOREIGN PATENT DOCUMENTS

GB 716759 * 10/1954 ............... A23G 3/28

* cited by examiner

*Primary Examiner* — Frederick C Nicolas
*Assistant Examiner* — Bob Zadeh
(74) *Attorney, Agent, or Firm* — Anderson Gorecki & Rouille LLP

(57) ABSTRACT

The present invention relates to improvements in the dispensing of foodstuffs from piping bags. The use of piping bags to dispense decorative materials, such as icing, on to surfaces is well known and has been in use for many years. When used in conjunction with a nozzle, such piping bags allow for the dispensing of decorative materials to create messages or patterns. The nozzle can have a variety different shapes and sizes which allow for the ribbon of decorative material to have the desired appearance when expelled from the bag. Existing piping bags are limited in that they typically only have a single compartment in which the decorative material can be placed. The present invention seeks to provide a piping bag and nozzle assembly which allows for the simultaneous and controllable dispensing of two or more decorative materials on to surfaces to create messages or patterns.

13 Claims, 8 Drawing Sheets

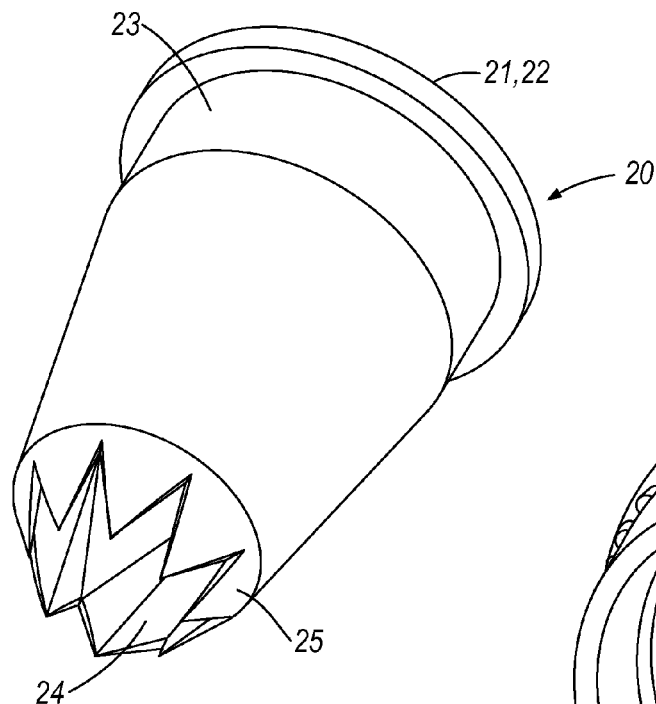
Fig.3
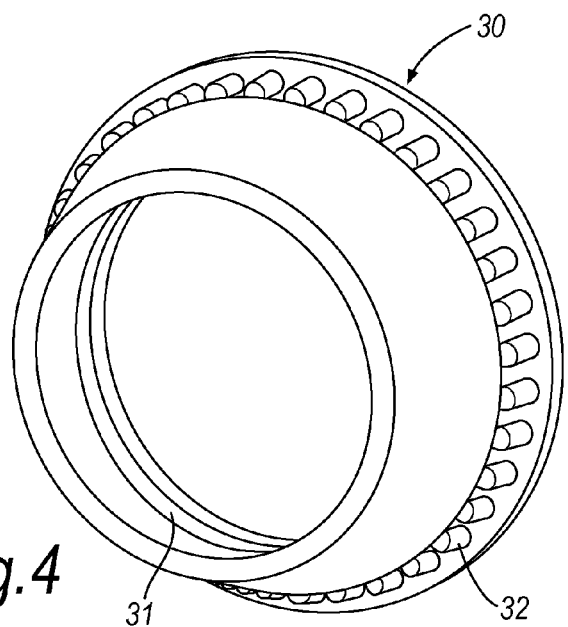
Fig.4
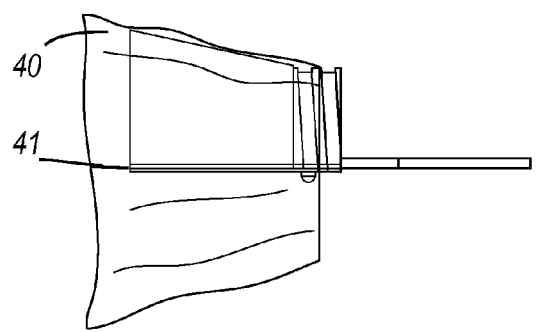
Fig.4.1
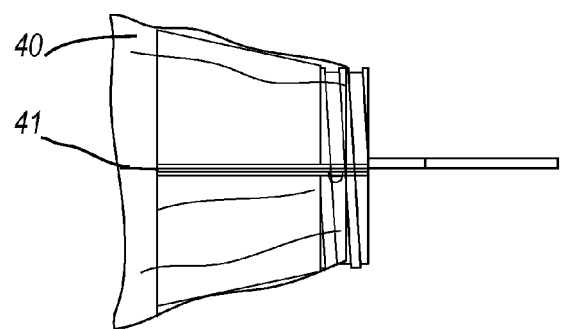
Fig.4.2

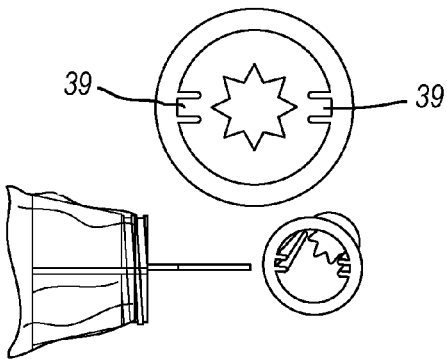
Fig.4.3
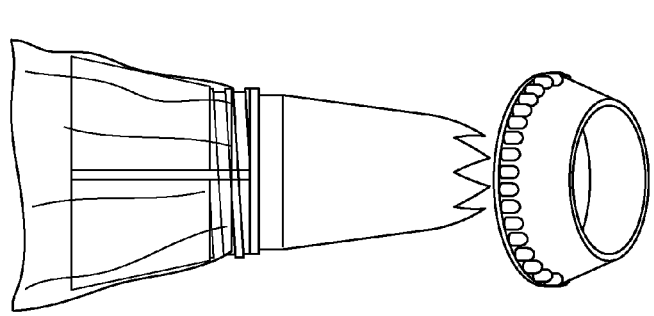
Fig.4.4
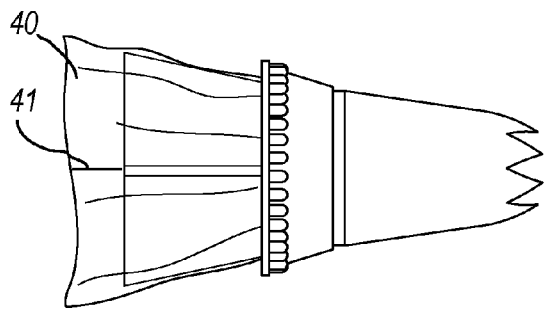
Fig.4.5
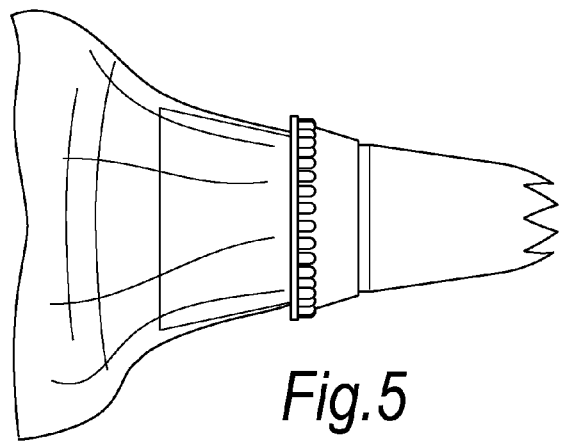
Fig.5
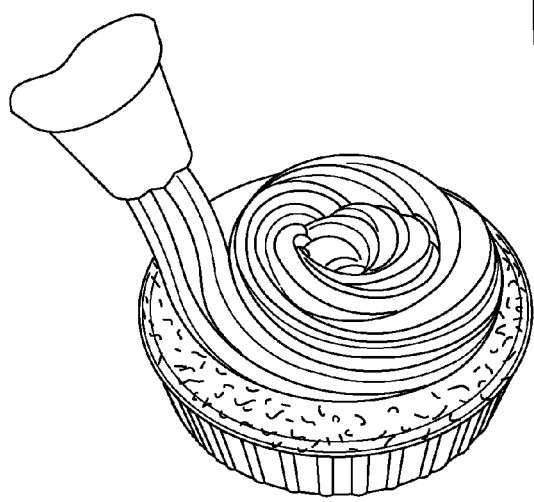
Fig.6

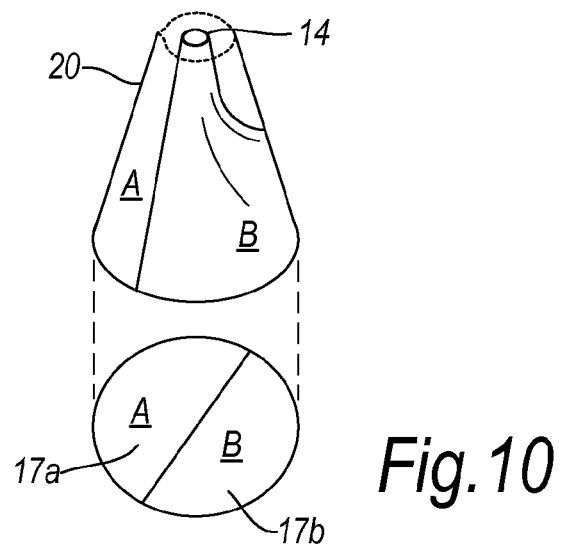
*Fig.10*
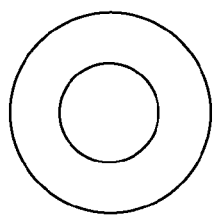
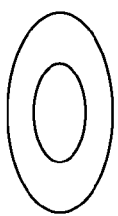
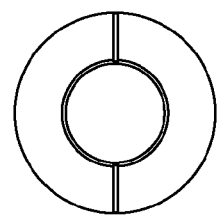
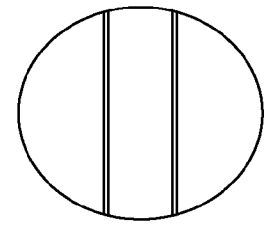
*Fig.10a*  *Fig.10b*  *Fig.11*  *Fig.12*
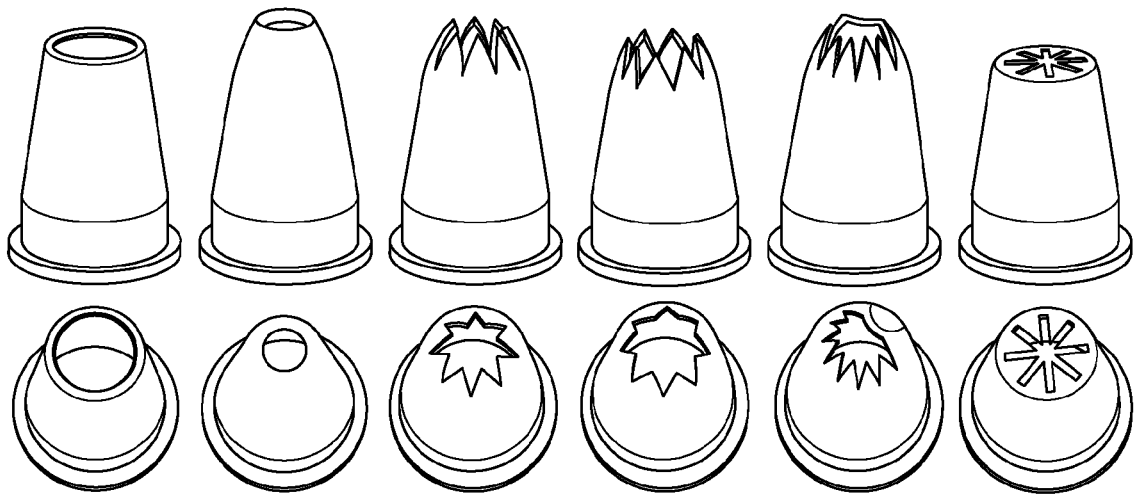
*Fig.13*

PIPING BAG AND NOZZLE

FIELD OF THE INVENTION

The present invention relates to improvements in the dispensing of foodstuffs from piping bags.

BACKGROUND TO THE INVENTION

The use of piping bags to dispense decorative materials, such as icing, on to surfaces is well known and has been in use for many years. When used in conjunction with a nozzle, such piping bags allow for the dispensing of decorative materials to create messages or patterns.

In use, a nozzle is placed at the open end of the piping bag. The nozzle can have a variety different shapes and sizes which allow for the ribbon of decorative material to have the desired appearance when expelled from the bag. The decorative material is then placed in the bag. By applying force to the bag, the decorative material is expelled out through the nozzle on to the surface to be decorated.

Existing piping bags are limited in that they typically only have a single compartment in which the decorative material can be placed. This means it is only possible to pipe one colour/material at a time. If more than one material is desired in close proximity as part of a decoration, it is necessary to place the decorative materials on the surface in separate stages, meaning that the user has to take great care to ensure that the materials as precisely placed. This is time-consuming, and can lead to a poorly generated message or pattern.

U.S. Pat. No. 5,114,044 (G Spanek) proposes two piping bags and nozzle systems that are collocated. This system cannot guarantee that the bags can be controlled simultaneous and the distinct output nozzles provide distinct decorative patterns.

SUMMARY OF THE INVENTION

The present invention seeks to address the issues and/or limitations of the prior art. The present invention seeks to provide an improved piping bag.

The present invention seeks to provide a piping bag and nozzle assembly which allows for the simultaneous and controllable dispensing of two or more decorative materials on to surfaces to create messages or patterns.

In accordance with a first aspect of the invention, there is provided a piping bag with a nozzle assembly for simultaneous dispensing two or more decorative materials, comprising:

a piping bag having two or more compartments, each compartment having a removable nozzle insert with a dispensing aperture projecting from an open end of the compartment;

a nozzle tip located over the nozzle inserts, said nozzle tip having a proximal end which is operably secured with respect to at least one of the piping bag and nozzle assembly and an outlet through which a decorative material may be dispensed;

wherein there is at least one tongue-like nozzle tip insert which projects within the nozzle tip whereby, in use, to allow a separate passageway of each material until in close proximity to the nozzle; and securing means reversibly connecting the nozzle tip and nozzle inserts to form the nozzle.

Conveniently, the nozzle tip has a shoulder about it proximal end, whereby to engage with a collar, which collar can have an internal screw-thread, operable to enable fastening with a corresponding external screw-thread associated with the nozzle inserts. Conveniently, the nozzle-tip insert comprises an extension of one or more of the nozzle inserts. Preferably, one or more of the nozzle inserts define a channel whereby, in use, continuity of separation between the two or more decorative materials can be enabled. By the provision of at least two flanges upon an inside face of the nozzle insert, each directed from the proximal end towards the outlet, the nozzle inserts can be guided within the nozzle tips whereby to ensure that the materials to be piped do not mix to any significant degree whilst within the nozzle tip. The provision of this tongue-like element within a guide defined with the nozzle insert can assist in the high definition of the interface between two materials when piped simultaneously from the bag. It will be appreciated that certain food dyes employed within the catering industry can leach from one piped food material to another, especially if relatively high pressures to pipe the material are employed. It is envisaged that the piping bag with a nozzle assembly can be supplied as separate components.

To prepare the piping bag with a nozzle assembly, the user inserts the nozzle inserts in to each of the compartments such that the dispensing aperture projects from an open end of the compartment. The user then places a nozzle tip over the nozzle inserts. The guide rails, if fitted, can assist in a correct alignment of the nozzle tip with respect to the nozzle inserts. The nozzle inserts which fits within a groove within the nozzle tip. If there are three materials employed, then three edges of the nozzle insert can be aligned with three guiderails. A securing means is then placed over the nozzle tip and nozzle inserts to hold the assembly in place. Once prepared, icing or other decorative materials is placed in to the compartments of the piping bag. The user then uses the piping bag as normal, and the decorative materials are dispensed in alignment to create the desired messages or patterns.

There can be couple of radially opposite guide-rails, to ensure uniformity of a pattern. There can be provided a number of radially opposite guide-rails whereby a non-radially symmetric nozzle outlet shape can be provided with, for example, a range of positions of delineation of colours or textures of material that is posed, in use.

A further embodiment of the first aspect of the invention is wherein the nozzle inserts have a tapered flat wall and a generally semi-circular wall extending from one side of the flat wall to the over side of the flat wall.

A further embodiment of the first aspect of the invention is wherein, when brought in proximity, the nozzle inserts form an external screw thread on to which the securing means is fastened.

A still further embodiment comprises a nozzle which has a bridging member at the tip, which bridging member abuts with or overlaps with the nozzle tip insert, whereby to ensure high definition between two or more piping materials, in use, the bridging member ensuring that the separate piped mixtures do not mix; after exit then the piped mixtures will lay adjacent one another.

A second aspect of the invention provides a kit for simultaneous dispensing two or more decorative materials, comprising:

a piping bag having two or more compartments, each compartment having a removable nozzle inserts with a dispensing aperture projecting from an open end of the compartment;

a nozzle tip adapted to be located over the nozzle inserts, said nozzle tip having a proximal end which is operably secured with respect to at least one of the piping bag and nozzle assembly and an outlet through which a decorative material may be dispensed;

wherein there is at least one tongue-like nozzle tip insert which projects within the nozzle tip whereby, in use, to allow a separate passageway of each material until in close proximity to the nozzle; a nozzle tip adapted to be located over the nozzle inserts; and securing means for reversibly connecting the nozzle tip and nozzle inserts to form a nozzle.

A third aspect of the invention provides a nozzle assembly for simultaneous dispensing two or more decorative materials, comprising:

two or more nozzle insert(s) with a dispensing aperture;

a nozzle tip adapted to be located over the nozzle inserts; and securing means for reversibly connecting the nozzle tip and nozzle inserts to form a nozzle.

The accompanying drawings illustrate an embodiment of the invention in which the piping bag has two compartments, and are discussed below to explain the invention further. As can be appreciated, the invention can be readily adapted in accordance with further aspects of the invention to provide a piping bag with a nozzle assembly allowing for dispensing three, four or more decorative materials.

BRIEF DESCRIPTION OF THE FIGURES

For a better understanding of the present invention, reference will now be made, by way of example only, to the Figures as shown in the accompanying drawing sheets, wherein:

FIG. 3 shows a perspective view of a nozzle tip.

FIG. 4 shows a perspective view of a securing means.

FIGS. 4.1-4.5 show how a twin bag nozzle assembly can be assembled.

FIG. 5 shows a perspective view of a piping bag with a nozzle assembly.

FIG. 6 shows a piping bag with nozzle assembly simultaneous dispensing two decorative materials.

FIGS. 10, 10a and 10b show features of a second variant of the invention.

FIG. 11 shows possible output flows in accordance with further aspects of the invention.

FIG. 12 shows possible output flows in accordance with further aspects of the invention.

FIG. 13 shows a selection of nozzle tips.

DETAILED DESCRIPTION OF THE PREFERRED EMBODIMENTS

There will now be described, by way of example only, the best mode contemplated by the inventor for carrying out the present invention. In the following description, numerous specific details are set out in order to provide a complete understanding to the present invention. It will be apparent to those skilled in the art, that the present invention may be put into practice with variations of the specific.

Figure 1:
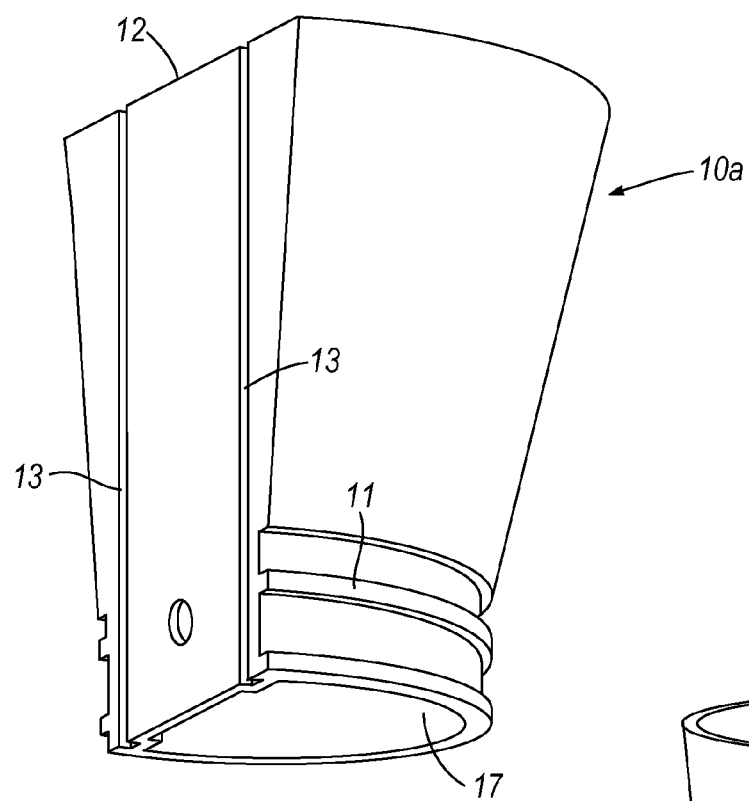
FIG. 1 shows a perspective view of a nozzle insert.

FIG. 1 shows an embodiment of a nozzle insert 10a. As shown the nozzle insert 10a is tapered with a lower end having part of an external screw thread 11 on to which a securing means is fastened. The nozzle insert 10a is hollow and thus forms a passage for the decorative material to pass through the dispensing aperture 17 from the piping bag compartment. In the embodiment shown here, one side of the nozzle insert 10a has a tapered flat wall 12 so that it can sit in close proximity to a further nozzle insert with the walls abutting. In the embodiment shown here the wall includes two grooves 13 which engage with ridges (not shown) on the corresponding nozzle insert thus ensuring that the nozzle inserts sit in close proximity. The nozzle insert 10a has downward tapered generally semi-circular cross section walls which curve around from the opposite edges of wall 12. The nozzle insert 10a can be made of metal, though it is envisaged that the present invention will have most application with a nozzle insert 10a made from a disposable plastic material.

Figure 2:
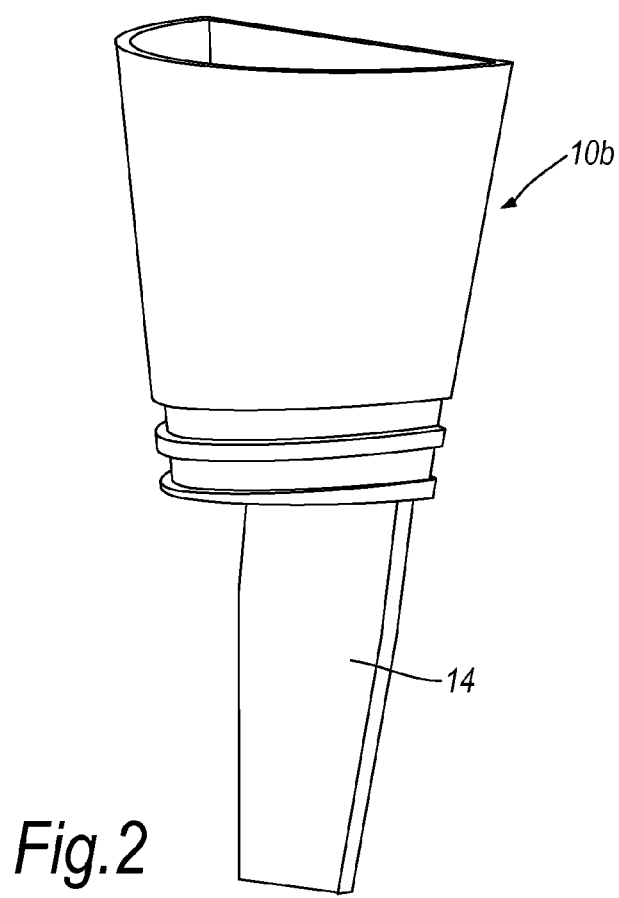
FIG. 2 shows a perspective view of a nozzle insert with a guide rail.

FIG. 2 shows a further embodiment of a nozzle insert 10b. The nozzle insert is largely the same dimensions and shape as nozzle insert 10a, however here the insert includes a tongue 14 which fits within a corresponding groove within the nozzle tip. This arrangement allows the correct alignment of the nozzle tip with the nozzle inserts. This ensures that the decorative materials are dispensed from the nozzle assembly is a precise, even alignment which greatly adds to the overall appearance of the desired messages or patterns.

The nozzle insert 10a and nozzle insert 10b are each placed within a separate compartment of the piping bag 40. The piping bag has an overall dimension and shape of those known in the art. However the bag includes one or more internal partitions 41 which act to divide the piping bag 40 into two or more compartments, in this case two. Each compartment has a narrow lower end dimensioned for use with a particular nozzle 10a 10b which is usually inserted through the wide upper end before the contents of the tube are loaded and dispensed through the narrow end. The piping bag 40 can be made of canvas, though it is envisaged that the present invention will have most application with a piping bag 40 made from a disposable plastic material.

Once inserted, a nozzle tip 20 is located over the nozzle insert 10a and nozzle insert 10b. The nozzle tip is a tube of a general shape as known in the art, having a downwardly tapering frusto-conical appearance. Optionally a flange 21 may be formed surrounding the upper end 22, with shoulder 23 in proximity which can aid locating the securing means on the assembly. An aperture 24 is located at the lower end of the nozzle tip 25 through which the contents of the piping bag compartments dispensed. Nozzle tips with apertures 24 of various shapes and sizes can be used in the present invention, since the nozzle tips are interchangeable with the other components of the nozzle assembly. For example it will be understood that rectangular nozzles or those which are serrated or star shaped along the edges may be employed. Nozzles of different widths may be used, all depending on the artistic effect which the user wishes to achieve. The nozzle tip 20 can be made of metal or a plastic material.

The nozzle tip can include a groove 39 within the inner wall which can receive the tongue 14 that extends from the nozzle insert 10b. This arrangement allows the correct alignment of the nozzle tip with the nozzle inserts, ensuring that the decorative materials are dispensed from the nozzle assembly in a precise, even alignment.

Once the nozzle tip 20 is located over the nozzle inserts 10a and 10b the components are held in place using a securing means. A number of different mechanisms can be used to secure the components in place. As way of example in the present embodiment the securing means is shaped as a ring 30 which is slipped upwards from the bottom end of the nozzle tip. The ring 30 includes an internal screw thread 31 on to which the securing means is fastened. The securing means clamps the nozzle inserts together and also fixes the nozzle tip in place. The securing means 30 can also include outwardly facing 5 projections 32 placed radially around its upper end which allow the user to more easily grip and tighten the securing means. The securing means 30 can be made of metal or a plastic material. FIGS. 4.1,4.2, 4.3, 4.4, 4.5 show the procedure for placing the nozzle pieces in each of the bags (4.1, 4.2), inserting the nozzle insert within the guides (4.3), followed by placing the nozzle items together and fastening the items together with the coupler ring (4.5).

FIG. 5 shows a piping bag with a nozzle assembly for simultaneous dispensing two or more decorative materials of the present invention, assembled and ready to use. The user then places the desired decorative materials in to the compartments of the piping bag. Typical examples of use decorative materials that can be dispensed using the piping bag with a nozzle assembly include icings for decorating cakes, or pureed vegetables e.g. carrots and potatoes.

FIG. 6 shows an example of the piping bag with a nozzle assembly of the present invention simultaneous dispensing two materials. The figure shows a ribbon of the two decorative materials in close proximity.

Figure 7A:
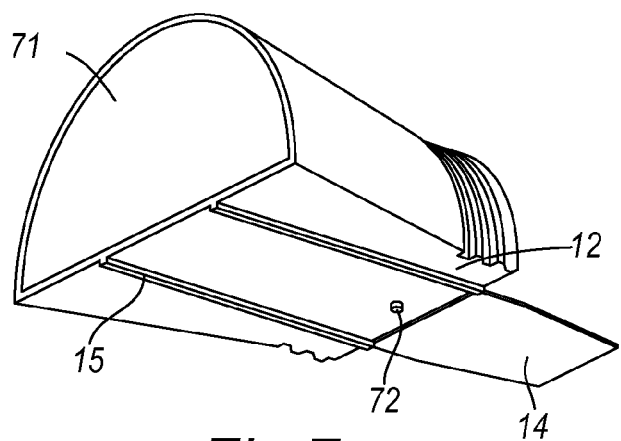
FIGS. 7a and 7b show detailed views of the embodiment shown in FIG. 2.
Figure 7B:
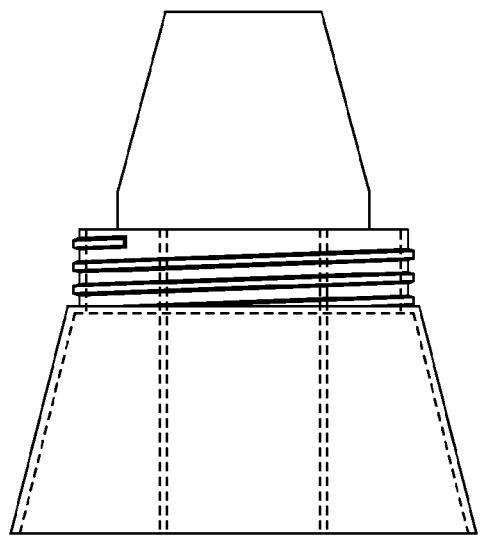
Figure 8A:
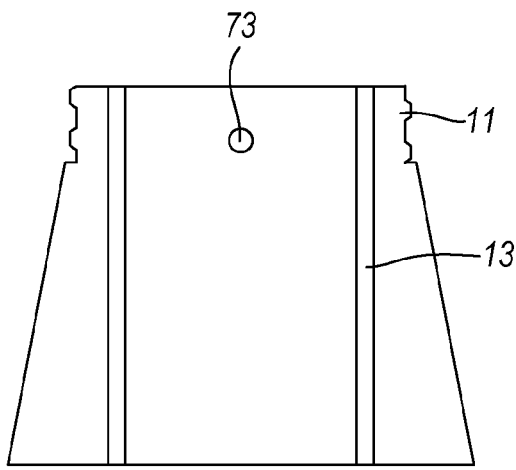
FIGS. 8a and 8b show detailed views of the embodiment shown in FIG. 1.
Figure 8B:
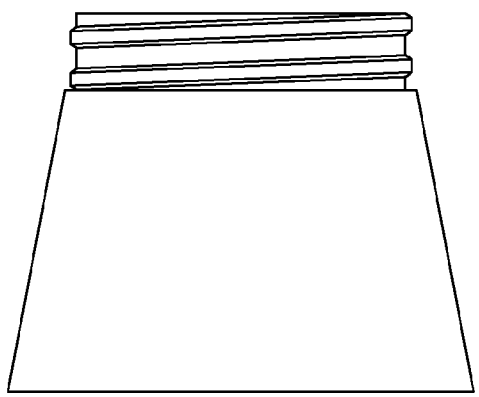

Referring now to FIG. 7a, there is shown a three-dimensional (part-ghost) representation of a nozzle insert with a nozzle tip insert extending therefrom. The insert corresponds with FIG. 2 and comprises a semi-circular frusto-conic body with an aperture 71 to allow passage of material to be piped from a nozzle, with a tongue 14 depending therefrom. The inside face 12 is provided with grooves 15 which cooperate with similarly shaped projections associated with a corresponding nozzle insert 13 per FIGS. 8a and 8b and as shown in FIG. 1. Additionally or alternatively, projection 72 cooperates with a corresponding notch 73 on a corresponding insert, per FIG. 8a. FIG. 7b shows the same nozzle insert from an external view of the semi-circular portion.

Figure 9:
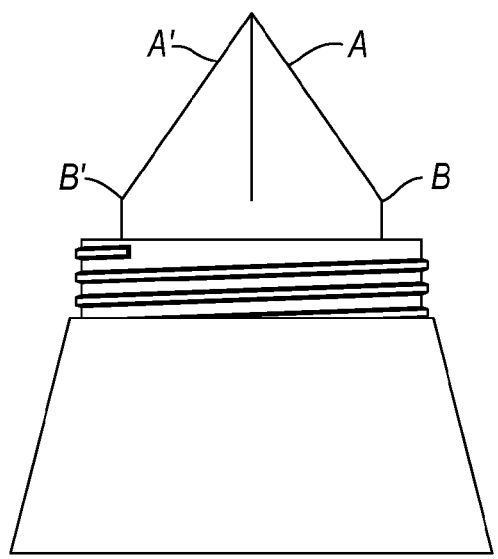
FIGS. 9. 9a and 9b show features of a first variant of the invention.
Figure 9A:
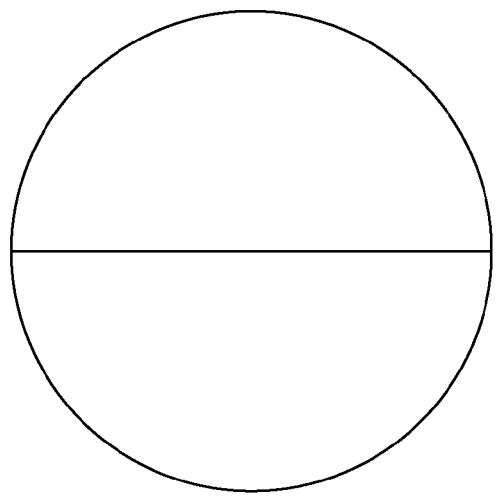
Figure 9B:
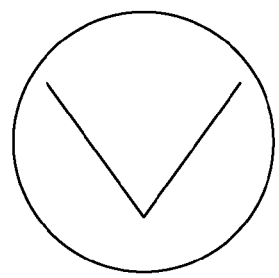

FIG. 9 shows a further variation wherein the tongue 14 has a central crease whereby to provide a "V" to the output flow, per FIG. 9b to enable a distinct output shape between the two materials. It will be appreciated that the pattern could be a continuous zig-zag pattern or an alternative, possibly more complex shape; indeed, the output aperture of the nozzle tip need not be circular: it could be rectangular, elliptical or curved. FIG. 9a shows how the tongue is arranged at the proximal portion of the nozzle tip, where the tongue is planar; FIG. 9b shows the tongue at the distal section of the nozzle, as discussed above. Conveniently, the inside surface of the nozzle tip has a plurality of guiderails and the two edges of the tongue engage with such guiderails. By having a plurality of such guiderails, then the tongue can be positioned in a number of fashions with respect to a non-circular outlet aperture of a nozzle tip, whereby to enable a range of different colour effects with two materials of different colours.

FIG. 10 shows a still further embodiment wherein a two material piping set provides materials A and B at the outlets 17a and 17b from the piping bag output into a central aperture 14 derived from tongue 14 having an end that encompasses the output in a circular fashion, the tongue 14 lying within the nozzle tip 20. FIG. 10a shows how the output from the device per FIG. 10 will look like; by changing the circular outputs to ellipses, then an output according to FIG. 10b could simply be provided.

FIGS. 11 and 12 shows two alternative systems, wherein the use of three coloured materials could result in a tricolour arrangement. FIG. 11 shows a central circular output bordered by a ring separated into two halves and 12 shows how consecutive colours could be arranged about a circular aperture; it will be appreciated that the overall aperture of the nozzle tip could be rectangular, for example, or other shapes.

FIG. 13 shows an arrangement of nozzle tips. From left to right in the Figure, the nozzles can provide large and small "writer" nozzles; a star nozzle; a rope nozzle; a turnable border nozzle; and a flower nozzle.

Figure 14A:
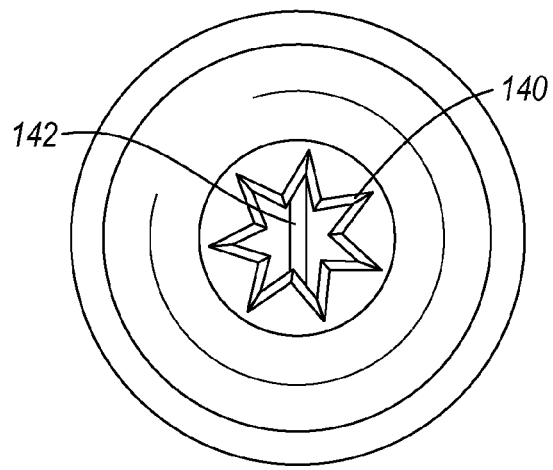
FIGS. 14a-14c show a seven spike star in plan view, a first side view and a second side view.
Figure 14B:
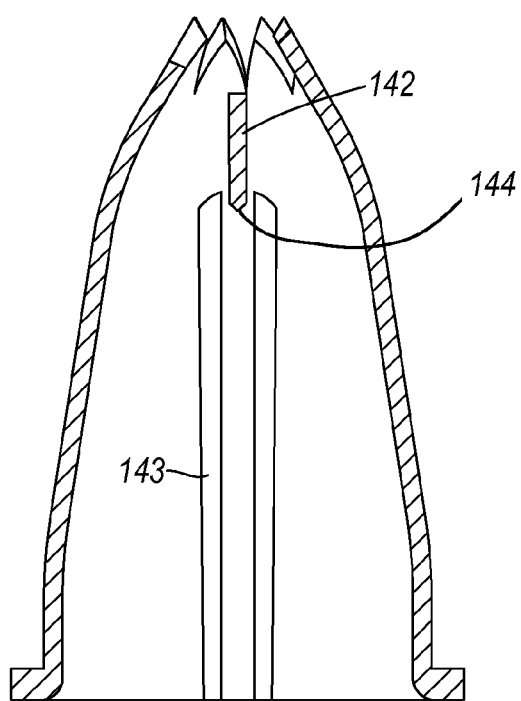
Figure 15A:
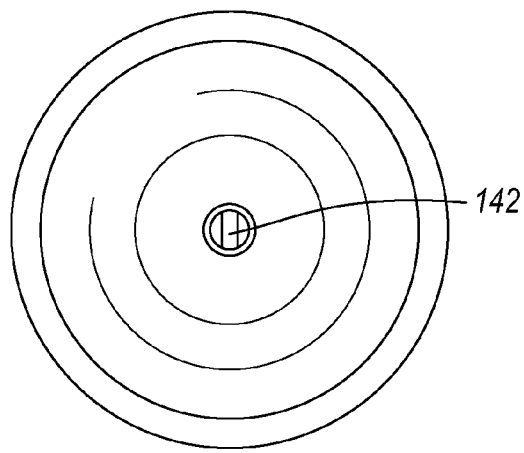
FIGS. 15a and 15b show a small circular aperture in plan view and a side view.
Figure 15B:
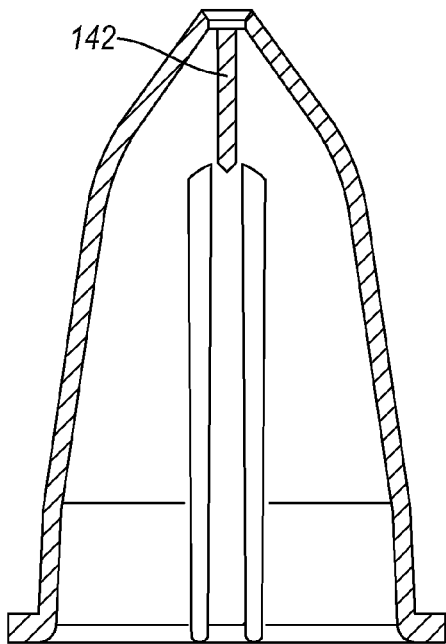

In a still further embodiment, the nozzle tips may include a bridge-like element, wherein the bridge like element comprises part of the tip of the nozzle, so that a standard tongue-like element can be used for several nozzles, where the interior dimensions of the inside nozzle are the same, the tongue-like element abutting or overlapping the bridge element to ensure that the two or more materials do not mix as they are urged from their respective bags. Referring to FIG. 14a, there is shown a view looking at the distal tip of a seven spike star 140; a bridge element 142 can clearly be seen. With reference to FIG. 14b, the channel guides 143 for receiving the tongue-like nozzle tip element 14 can also clearly be seen. FIG. 15a shows a small circular aperture with a small bridge 142 in plain view. FIG. 15b show the bridge from the side. The bridge is shaped so as not to impair flow of the material through the piping nozzle. With reference to FIG. 15a, the nozzle 150 is a small circular aperture.

Figure 14C:
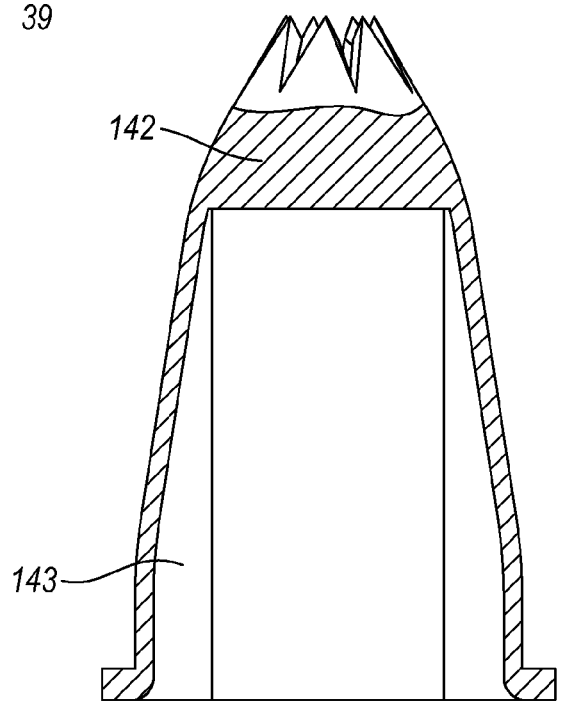
Figure 16A:
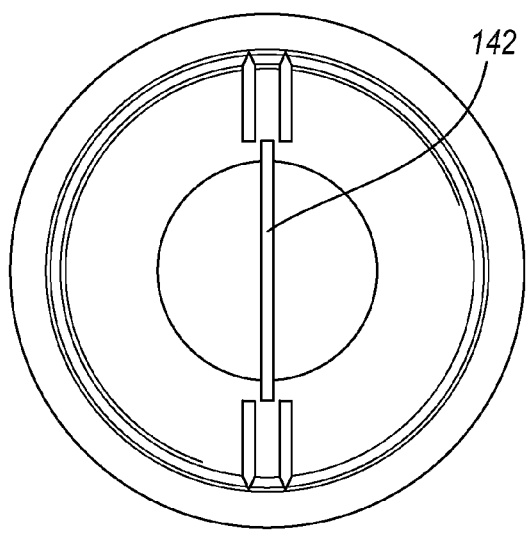
FIGS. 16a and 16b show a large circular aperture in plan view and a side view.
Figure 16B:
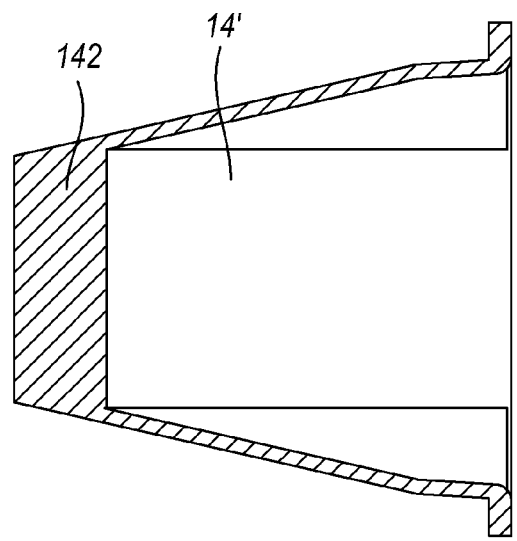

It has been found that by having the bridge in place, the division between two piping materials can be maintained until the mixtures exit from the nozzle. FIG. 15b, another cut-away view of a nozzle shows the inside surfaces, and clearly shows bridge 142. Again, FIGS. 16a and 16b show overhead and cut-away views of a further circular nozzle 160. In FIG. 16b, 14' indicates where a tongue like nozzle tip element 14 will be placed in use, whereby to ensure that two mixtures do not mix after being forced from the bags, whilst remaining in the nozzle.

The invention claimed is:

1. A piping bag with a nozzle assembly for simultaneous dispensing two or more decorative materials, comprising:
a piping bag having two or more compartments, each compartment having a removable nozzle insert with a dispensing aperture, each nozzle insert projecting from an open end of the compartment;
a nozzle tip located over the nozzle inserts, said nozzle tip having a proximal end which is operably secured with respect to at least one of the piping bag and nozzle inserts and an outlet configured to dispense a decorative material;
wherein at least one of the nozzle inserts has a tongue which projects within the nozzle tip, the tongue, in connection with the nozzle tip, defining separate passageways from each of the two or more compartments through the nozzle assembly until at or in close proximity to the outlet of the nozzle tip; and
a securing ring reversibly connecting the nozzle tip and nozzle inserts to form the nozzle assembly;
wherein the nozzle tip has a plurality of grooves extending from the proximal end of the nozzle tip to the outlet of the nozzle tip within an inside surface of the nozzle tip;
wherein the at least one tongue has edges which abut against the inside surface of the nozzle tip, the edges of the at least one tongue being shaped to slide within the grooves of the nozzle tip to provide correct alignment of the at least one tongue within the nozzle tip along a length of the tongue from the proximal end of the nozzle tip to the outlet of the nozzle tip to enable continuity of separation between said two or more separate passageways while dispensing decorative materials from each of the two or more compartments.

2. The assembly of claim 1 wherein there are two compartments.

3. The assembly of claim 1 wherein there are three compartments.

4. The assembly of claim 1 wherein there are four compartments.

5. The assembly of claim 1, wherein there are two compartments and wherein the nozzle inserts have a tapered flat wall and an arcuate wall extending from one side of the tapered flat wall to the other side of the tapered flat wall.

6. The assembly of claim 1, wherein there are three compartments and wherein the nozzle inserts comprise tri-sectored components and have tapered flat radial walls and an arcuate external wall extending from first and second radial walls.

7. The assembly of claim 1, wherein there are four compartments and wherein the nozzle inserts comprise four-sectored components and have tapered flat radial walls and an arcuate external wall extending from first and second radial walls.

8. The assembly of claim 1, wherein when brought in proximity the nozzle inserts form an external screw thread on to which the securing ring is fastened.

9. The assembly of claim 1, wherein the securing ring is a ring having an internal screw thread.

10. The assembly of claim 1, wherein the outlet of the nozzle tip is selected from a circle, a rectangle, an ellipse, a star shape or a ring.

11. The assembly of claim 1, wherein the nozzle has a bridging member at the nozzle tip and the at least one tongue-like nozzle insert abuts or overlaps with said bridging member.

12. A kit for simultaneous dispensing two or more decorative materials, comprising:
   a piping bag having two or more compartments, each compartment having a removable nozzle insert with a dispensing aperture, each nozzle insert projecting from an open end of the compartment;
   a nozzle tip adapted to be located over the nozzle inserts, said nozzle tip having a proximal end which is operably secured with respect to at least one of the piping bag and nozzle inserts and an outlet configured to dispense a decorative material;
   wherein at least one of the nozzle inserts has a tongue which projects within the nozzle tip, the tongue, in connection with the nozzle tip, defining separate passageways from each of the two or more compartments through the nozzle assembly until at or in close proximity to the outlet of the nozzle tip; and
   a securing ring for reversibly connecting the nozzle tip and nozzle inserts to form a nozzle assembly;
   wherein the nozzle tip has a plurality of grooves extending from the proximal end of the nozzle tip to the outlet of the nozzle tip within an inside surface of the nozzle tip; and
   wherein the at least one tongue has edges which abut against the inside surface of the nozzle tip, the edges of the at least one tongue being shaped to slide within the grooves of the nozzle tip to provide correct alignment of the at least one tongue within the nozzle tip along a length of the tongue from the proximal end of the nozzle tip to the outlet of the nozzle tip to enable continuity of separation between said two or more separate passageways while dispensing decorative materials from each of the two or more compartments.

13. A nozzle assembly for simultaneous dispensing two or more decorative materials, comprising:
   two or more nozzle inserts, each of the two or more nozzle inserts having a dispensing aperture, at least one of the nozzle inserts including a tongue extending beyond the dispensing aperture;
   a nozzle tip adapted to be located over the two or more nozzle inserts, the nozzle tip having two or more grooves to receive edges of the tongue of the at least one of the nozzle inserts along a length of the tongue of the at least one of the nozzle inserts; and
   a securing ring for reversibly connecting the nozzle tip and the two or more nozzle inserts.

* * * * *